United States Patent [19]

Gosser

[11] Patent Number: 4,889,705
[45] Date of Patent: * Dec. 26, 1989

[54] HYDROGEN PEROXIDE METHOD USING OPTIMIZED H+ AND BR− CONCENTRATIONS

[75] Inventor: Lawrence W. Gosser, Wilmington, Del.

[73] Assignee: E. I. Du Pont de Nemours and Company, Wilmington, Del.

[*] Notice: The portion of the term of this patent subsequent to Jul. 21, 2004 has been disclaimed.

[21] Appl. No.: 193,842

[22] Filed: May 13, 1988

[51] Int. Cl.$^4$ .............................................. C01B 15/02
[52] U.S. Cl. ................................................... 423/584
[58] Field of Search ........................................ 423/584

[56] References Cited

U.S. PATENT DOCUMENTS

| | | | |
|---|---|---|---|
| 3,336,112 | 8/1967 | Hooper | 423/584 |
| 3,361,533 | 1/1968 | Hooper | 423/584 |
| 3,433,582 | 3/1969 | Campbell | 23/60 |
| 4,007,256 | 2/1977 | Kim et al. | 423/584 |
| 4,009,252 | 2/1977 | Izumi et al. | 423/584 |
| 4,279,883 | 7/1981 | Izumi et al. | 423/584 |
| 4,335,092 | 6/1982 | Dalton, Jr. et al. | 423/584 |
| 4,336,238 | 6/1982 | Dalton, Jr. et al. | 423/584 |
| 4,336,239 | 6/1982 | Dalton, Jr. et al. | 423/584 |
| 4,379,778 | 4/1983 | Dalton, Jr. et al. | 423/584 |
| 4,389,390 | 6/1983 | Dalton, Jr. et al. | 423/584 |
| 4,661,337 | 4/1987 | Brill | 423/584 |
| 4,681,751 | 7/1987 | Gosser | 423/584 |
| 4,772,458 | 9/1988 | Gosser et al. | 423/584 |

OTHER PUBLICATIONS

Posplova et al., *Russian Journal of Physical Chemistry*, 35(2): 143–148, (1961).
Swern, *Organic Peroxides*, Wiley—Interscience, New York, p. 26, (1970).
Schumb et al., *Hydrogen Peroxide*, Reinhold Publishing Corporation, p. 179, (1955).
Halle, *Chemical and Engineering News*, 62(27): 4, (1984).
Schwoegler, *Chemical and Engineering News*, 63(1): 6, (1985).

Primary Examiner—John Doll
Assistant Examiner—Wayne A. Langel

[57] ABSTRACT

A catalytic process for making $H_2O_2$ from $H_2$ and $O_2$ in an aqueous medium which comprises using $H^+$ ions and $BR^-$ ions each, independently, in the range from about 0.001 to about 0.05 M.

3 Claims, 1 Drawing Sheet

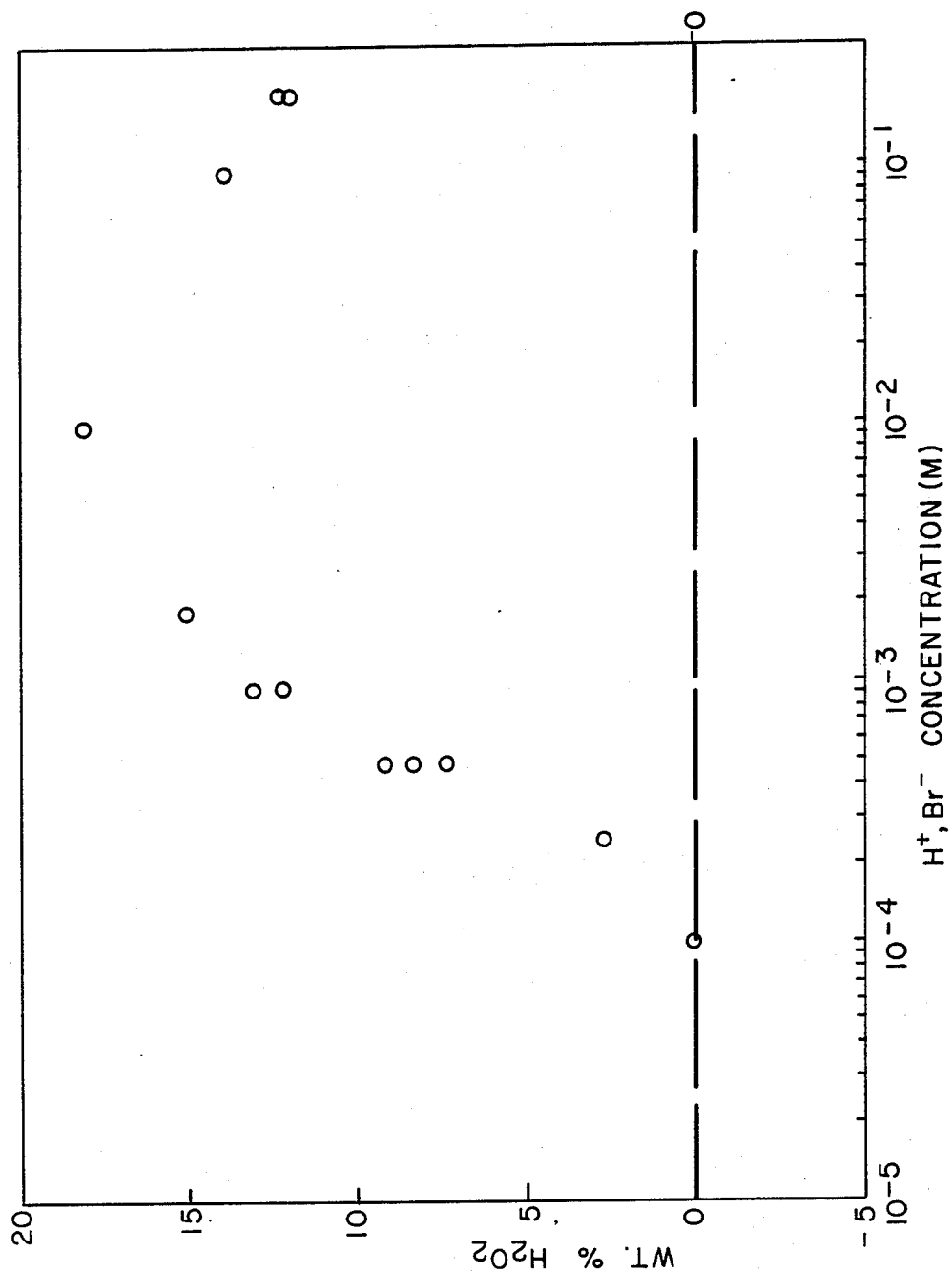

HYDROGEN PEROXIDE METHOD USING OPTIMIZED H+ AND BR− CONCENTRATIONS

BACKGROUND OF THE INVENTION

1. Field of the Invention

This invention relates to an improved catalytic process for producing hydrogen peroxide from hydrogen and oxygen.

2. Background of the Invention

The following references disclose catalytic processes for producing hydrogen peroxide from hydrogen and oxygen. One problem associated with known direct combination processes is that product yields are too low for large scale commercial applications. Improved processes for producing hydrogen peroxide in high concentrations are of significant interest to the chemical industry.

U.S. Pat. No. 3,336,112, issued to Hooper, discloses a process for producing hydrogen peroxide which comprises contacting hydrogen and oxygen with a solid catalyst in the liquid phase in the presence of water and a hydrogen peroxide stabilizer, for example, a sequestrative hydrogen peroxide stabilizer.

U.S. Pat. No. 3,361,533, also issued to Hooper, discloses a process for the production of hydrogen peroxide which comprises contacting hydrogen and oxygen with a solid catalyst in the liquid phase in the presence of water, an acid and a non-acidic oxygen-containing organic compound.

U.S. Pat. No. 3,433,582, issued to Campbell, discloses a process for producing hydrogen peroxide which comprises contacting hydrogen and oxygen with a solid catalyst in a liquid medium containing water and dissolved boric acid. The patent discloses that there may also be present a second radical, especially a halogen or pseudo-halogen.

U.S. Pat. No. 4,007,256, issued to Kim et al., discloses a process for the production of hydrogen peroxide by contacting hydrogen and oxygen with a supported palladium catalyst in the presence of water, an organic nitrogen-containing compound and a strong acid.

Posplova et al., Russian Journal of Physical Chemistry, 35(2):143–148 (1961) disclose a palladium-catalyzed synthesis of hydrogen peroxide from hydrogen and oxygen. Palladium black and palladium deposited on alumina gel, tungstic anhydide, silica gel, and bone charcoal were used as catalysts.

U.S. Pat. No. 4,009,252, issued to Izumi et al., discloses a process for preparing hydrogen peroxide by a catalytic reaction of hydrogen and oxygen in an aqueous medium containing a platinum-group catalyst. The process is characterized in that the partial pressure of hydrogen and the partial pressure of oxygen in the gaseous phase of the reaction system are maintained at at least 0.5 atmosphere and at least 1.0 atmosphere, respectively. The platinum group catalyst is caused to be present in an amount, calculated as metal, of at least a minimum effective catalytic amount up to 30 mg per 100 mL of the aqueous medium.

U.S. Pat. No. 4,279,883, issued to Izumi et al., discloses an improved process for preparing hydrogen peroxide by reacting hydrogen with oxygen in the presence of a catalyst in an aqueous medium containing hydrogen peroxide; the improvement comprises using an aqueous medium which contains dissolved hydrogen and a platinum-group catalyst having hydrogen adsorbed thereto. Materials such as carbon, silica, and a number of other materials are described as being suitable for supporting the platinum group metal.

U.S. Pat. No. 4,335,092, issued to Dalton, Jr. et al., discloses a process for preparing hydrogen peroxide in which hydrogen and oxygen are contacted with a supported palladium catalyst in the presence of a methanol solution. Preferably, the solution contains up to 1.0% by weight of formaldehyde and is at least 0.001 N in hydrochloric acid.

U.S. Pat. No. 4,336,238, issued to Dalton, Jr. et al., discloses an improvement in a process for producing hydrogen peroxide by contacting a mixture of hydrogen and oxygen with a palladium on carbon catalyst in the presence of an acidic aqueous liquid capable of inhibiting decomposition of hydrogen peroxide. The improvement comprises prolonging the useful life of the catalyst by continuous removal of palladium salts produced by solubilization of the catalyst from the acidic aqueous liquid. The medium employed comprises up to 95% by volume of an organic solvent.

U.S. Pat. No. 4,336,239, issued to Dalton, Jr. et al., discloses an improvement in hydrogen peroxide synthesis from hydrogen and oxygen in an acidic medium containing an oxygenated or nitrogenous organic compound using a supported Group VIII noble metal catalyst. The improvement comprises using an oxygen/hydrogen ratio higher than about 3.4 and a catalyst level above 30 mg per 100 mL of medium.

U.S. Pat. No. 4,379,778, issued to Dalton, Jr. et al., discloses improvements in palladium-carbon atalysts for the production of hydrogen peroxide from a mixture of hydrogen and oxygen in the presence of an aqueous liquid capable of inhibiting the decomposition of hydrogen peroxide. The improvement comprises pretreating the catalyst with an aldehyde or ketone, and, preferebly, also pretreating the catalyst with a dilute solution of hydrochloric acid. Improved catalysts are obtained by reducing a soluble palladium compound deposited on a high surface area non-graphitic carbon base, in the form of a dried powder, with hydrogen at 27°–200° C.

U.S. Pat. No. 4,389,390, issued to Dalton, Jr., et al., discloses an improvement in a process for producing hydrogen peroxide by contacting a mixture of hydrogen and oxygen with a palladium on carbon catalyst in the presence of an acidic liquid capable of inhibiting decomposition of hydrogen peroxide. The improvement comprises prolonging the useful life of the catalyst by continuous removal of palladium salts produced by solubilization of the catalyst from the acidic liquid, preferably by employing high surface area activated carbon as the catalyst support and adsorbent for palladium salts.

The following four publications disclose the danger inherent in producing hydrogen peroxide in the presence of an organic component. Swern, *Organic Peroxides*, Wiley-Interscience, New York, page 26, (1970) discloses the preparation of peroxy compounds from aldehydes and hydrogen peroxide. The reference discloses that extreme caution should be taken when handling and preparing ketone peroxides, since some are very sensitive and explode with violence. Schumb et al., *Hydrogen Peroxide*, Reinhold Publishing Corporation, page 179 (1955) describes explosive characteristics of solutions of methyl alcohol, ethyl alcohol, or glycerine in concentrated hydrogen peroxide. Halle, *Chemical and Engineering News*, 62(27):4 (1984) describes potential hazards associated with organic peroxides. Schwoegler, *Chemical and Engineering News*, 63(1):6 (1985) describes the shock sensitivity Of acetone peroxides.

U.S. Pat. No. 4,681,751, issued to Gosser, discloses a method for making hydrogen peroxide from hydrogen and oxygen employing a catalytically effective amount of Pd on adsorbent carbon, an aqeuous reaction medium and superatmospheric pressure.

Allowed (commonly assigned) U.S. application Ser. No. 932,360, filed Nov. 19, 1986 in the names of Gosser and Schwartz, discloses an improved method for making hydrogen peroxide in which the reaction is carried out in the presence of hydrogen ions and bromide ions in a molar ratio of at least about 2:1.

SUMMARY OF THE INVENTION

The present invention relates to an improved catalytic method for making hydrogen peroxide from the direct combination of hydrogen and oxygen in an aqueous medium comprising a platinum, palladium or combination platinum/palladium catalyst and HBr. Specifically, the improvement comprises employing $H^+$ ions and $Br^-$ ions, each, independently, at a concentration of from about 0.001 to about 0.05 M, which results in optimization of the process relative to $H^+$ and $Br^-$ concentrations. The $H^+$ and $Br^-$ can be supplied directly as hydrobromic acid or indirectly as a combination of a strong acid other than hydrobromic acid and, for example, a bromide salt.

BRIEF DESCRIPTION OF THE DRAWING

The drawing consists of one FIGURE which shows weight percent $H_2O_2$ versus $H^+$ and $Br^-$ concentration.

DETAILED DESCRIPTION OF THE INVENTION

The present invention provides an improved catalytic process for making hydrogen peroxide from hydrogen and oxygen. It has been found that high product yields can be achieved by employing an aqueous reaction medium comprising $H^+$ ions and $Br^-$ ions, each, independently, at a concentration of from about 0.001 to about 0.05M and a catalytically effective amount of palladium, platinum, or a combination thereof. These high product yields make the present method commercially feasible for large-scale applications.

The process of this invention employs a catalytically effective amount of palladium, platinum, or a combination thereof. The form of the specified metals is not critical. The metals can be employed in the form of metal ions by using palladium and/or platinum salts, or in the form of bulk metal. The specified metals can also be employed in the form of a supported catalyst, optionally a supported catalyst prepared from a metal colloid. Suitable supports include various forms of carbon, silica, alumina, or ion exchange resins. Preferably, the ratio of palladium to platinum is above about 20 weight percent, and most preferably above about 50 weight percent. In one embodiment, the specified metals are employed in the form of a metal colloid.

Regardless of whether the catalyst is premade or made in situ in the aqueous reaction medium, the medium will comprise $H^+$ ions and $Br^-$ ions. The bromide ion source can be, for example, HBr, a soluble metal bromide or a compound hydrolyzable or reducible to produce bromide ion under reaction conditions.

The $H^+$ and bromide ion concentrations in the reaction medium are each, independently of the other, in the range from about 0.001 to about 0.05 M. The molar ratio of bromide ion to metal (Pd and/or Pt) is generally from about $10^{-4}:1$ to about $10^4:1$, preferably from about $10^2:1$ to about $10^{-3}:1$, and most preferably 10:1 to about $10^{-2}:1$.

Chloride and other compatible halide ions can also be present in the reaction medium, but preferably the concentration of halide ions other than bromide ion is not greater than the concentration of the bromide ion. Preferably, the total halide ion concentration is not greater than about $10^{-1}$ M, to produce a hydrogen peroxide product with a low total halide content.

The $H^+$ and $Br^-$ may be supplied directly as hydrobromic acid or indirectly as a combination of a strong acid (other than HBr) and, for example, a bromide salt. Suitable acids include hydrochloric, phosphoric, sulfuric, nitric and perchloric. Other protonic acids having a pK less than about 8 can be employed, provided they are compatible with other components of the reaction medium.

Typically, the process can be run at relative ambient partial pressures of $O_2$ to $H_2$ of about 2 to 1 up to 20 to 1 or higher. Ratios of 20 to 1 and above are preferred to avoid the possibility of explosion during continuous process runs. Although ratios of less than 2 to 1 can be employed, such ratios may result in lower hydrogen peroxide concentrations.

The process can be carried out at $-50°$ C. to $90°$ C. and preferably from about $0°$ C. to $50°$ C. Lower temperatures can be employed so long as liquid freezing is not a problem. Depending on the type and concentration of reaction ingredients, temperatures below $-10°$ C. are contemplated. Presence of about 45 weight percent hydrogen peroxide in the reaction mixture will permit operation at $-50°$ C. without freezing. It has been found that higher temperatures can be employed provided the reaction system is free of impurities that promote hydrogen peroxide decomposition.

Preferably the present process is conducted at a superatmospheric pressure. Preferred pressures are in the range of from about 200 psig (1.48 MPa) to 4000 psig (17.7 MPa) with increasing hydrogen peroxide concentrations resulting from use of higher pressures. Most preferred pressures for hydrogen peroxide formation are about 400 psig (2.86 MPa) to 2500 psig (17.34 MPa). In semibatch operation, with gases continuously entering and exiting the reactor, peroxide concentrations above about 30% can be achieved at about 10 MPa and an inlet $O_2/H_2$ ratio of about 4:1.

An advantage of the use of a substantially all-aqueous medium (no greater than about 2% by weight of an organic component) is that explosion hazards associated with the combination of high hydrogen peroxide concentrations and organic cosolvents are absent. Another advantage is that a large organic recycle stream is avoided. Other advantages include the lessening of explosive hazards caused by buildup of organic peroxy compounds and elimination of catalyst deactivation caused by decomposition of organic materials.

In a most preferred embodiment, continuous operation of the process of this invention can be conducted at about 1000 psig (7.0 MPa) total pressure, a $O_2/H_2$ inlet ratio of about 3:1, about 0.01 M HBr, and about $20°$ C., with vigorous gas-liquid contact.

The optimization realized by using the present invention is illustrated by the following examples and the FIGURE, which graphically illustrates the results of the examples.

General Procedure for Producing $H_2O_2$

The apparatus used was a nominally 400 mL autoclave containing a glass liner. The free space in the empty autoclave-liner combination was about 350 mL. The autoclave was mounted on a shaking table in a large metal barricade with facilities for adding and removing gases and monitoring the pressure and the temperature of the metal autoclave from outside of the barricade. Each experiment was started by weighing the empty glass liner. A catalyst (20 mg of 5% Pd/C) and 20 g of aqueous acid were added, and the liner was reweighed. The liner was placed in the autoclave and the autoclave was placed in a cooling jacket on the shaker table. Argon (about 1000 psi) was added to check for leaks. The pressure was reduced to about 5 psia and then about 360 psia $H_2$ and about 1650 psia $O_2$ were added. After about 15 minutes $O_2$ was added to restore the total pressure to about 2000 psia. The shaking was started and continued for about three hours. The remaining gas was released, and the vessel was filled to 50 psig with argon and vented three times to remove the last of the $H_2/O_2$ mixture. The liner was then removed from the autoclave and reweighed. A portion of the reaction mixture was titrated with potassium permanganate solution. The wt % $H_2O_2$ obtained from the titration and the weight gain can be used to calculate the selectivity as moles $H_2O_2$ formed divided by the sum of moles water and moles $H_2O_2$ formed. This value was multiplied by 100 to express it as a percentage in the Tables. Additional details of the individual experiments are given in the Table. The results are shown graphically in the Drawing.

TABLE

| Temp °C. | ΔP psi | ΔWt g | $H_2O_2$ Wt % | Sel. % | $H^+$, $Br^-$ N |
|---|---|---|---|---|---|
| 12–17 | 516 | 4.8 | 0.0 | 0 | 0.0001 |
| 12–16 | 445 | 5.3 | 2.7 | 7 | 0.00025 |
| 15–16 | 440 | 5.4 | 4.6 | 13 | 0.005 |
| 13–18 | 456 | 6.0 | 13.0 | 41 | 0.001 |
| 14–20 | 454 | 6.4 | 14.9 | 46 | 0.002 |
| 13–16 | 499 | 6.4 | 17.9 | 60 | 0.01 |
| 8–10 | 267 | 4.3 | 13.7 | 65 | ~.1* |
| 10–11 | 244 | 3.7 | 12.1 | 65 | ~.2* |
| 9–12 | 230 | 3.7 | 11.8 | 62 | ~.2* |
| 11–13 | 441 | 6.4 | 16.8 | 54 | ~.005* |

*$H^+$ and $Br^-$ provided by using $H_2SO_4$ and NaBr.

These results show that $H_2O_2$ selectively is maximized using $H^+$ and $Br^-$, each at a concentration of about 0.01 M.

What is claimed is:

1. A process for making hydrogen peroxide, comprising contacting hydrogen and oxygen in an aqueous reaction medium containing no more than about 2% by weight of an organic component, in the presence of a catalyst comprising platinum, palladium or a combination thereof and $H^+$ ions and $Br^-$ each of said ions being, independently of the other, at a concentration of from about 0.001 M to about 0.05 M.

2. The method of claim 1 wherein the platinum, palladium, or combination thereof is supported on a support selected from the group consisting of carbon, silica and alumina.

3. The method of claim 1 wherein the $H^+$ ions and the $Br^-$ ions are each at a concentration of about 0.01 M.

* * * * *